Patented Sept. 7, 1926.

1,599,185

UNITED STATES PATENT OFFICE.

GUSTAVE T. REICH, OF ANAHEIM, CALIFORNIA.

PROCESS FOR THE RECOVERY OF ALCOHOL, ORGANIC ACIDS, AND FERTILIZER FROM FERMENTED SACCHARINE MATERIALS.

No Drawing. Application filed June 15, 1925. Serial No. 37,386.

This invention relates to the treatment of liquids containing alcohol produced by fermentation processes and known as beer for the recovery of alcohol, organic acids and a nitrogenous residue known as fertilizer.

The customary method for the manufacture of alcohol consists principally in diluting saccharine materials such as cane or beet molasses with water, using for instance 25000 gallons of molasses and 75000 gallons of water, adding yeast and fermenting, thereby producing 100,000 gallons of a fermentation liquid containing approximately 10% of alcohol known as beer. This liquid is subjected to distillation in a so-called beer still, producing approximately 10000 gallons of alcohol and a residual liquid known as slop containing organic acids and material suitable for use as fertilizer. The slop from 100,000 gallons of the fermentation liquid, when steam distillation is employed for separating the alcohol, ordinarily amounts to about 100,000 gallons, comprising 90000 gallons of the dealcoholized fermentation liquid and 10000 gallons of condensed steam.

The slop is treated in various ways for the recovery of its organic acid and fertilizer contents. A customary procedure for the treatment of the slop involves concentrating the slop in a multiple effect vacuum evaporator. In the supposed case this involves the evaporation of about 90000 gallons of water and gives 10000 gallons of concentrated slop which is then further treated for the recovery of organic acids and fertilizer material.

The process outlined above has a number of objectionable features, the principal of which are the high consumption of heat and certain difficulties involved in the distillation.

Molasses, especially cane molasses from some localities, contains an appreciable amount of calcium sulfate which, due to the fact that it is less soluble in hot than in cold water and alcohol, separates out in the so-called beer still in the form of rock-like deposits which greatly reduce the efficiency of the still and make it necessary to shut down and clean the still at relatively short intervals. It is customary to use wooden stills which are less damaged by the cleaning operation than are stills made of metal, or to use a much greater dilution of the molasses than the 1:3 ratio referred to above, which to some extent prevents the formation of scale. Another objectionable feature incident to the deposition of calcium sulfate in the still is that the deposits clog the passages making a higher distilling pressure and temperature necessary, as a result of which the heat economy of the still is reduced and greater quantities of odorous impurities distill with the alcohol.

The recovery of the organic acids and fertilizer material from the slop which involves the evaporation of a large quantity of water is so expensive that in most instances it is not economical and the slop is wasted.

An object of the present invention is to improve the heat economy of the process.

Another object of the invention is to eliminate the deposition of calcium sulfate in the so-called beer still and the disadvantages incident thereto.

Still another object of the invention is to improve upon prior methods for the recovery of organic acids and fertilizer from the slop.

In accordance with my invention the fermentation liquid is first neutralized by treating it with a suitable agent such as an alkali metal carbonate or with caustic alkali and then with carbon dioxid in quantity preferably just sufficient to convert any calcium sulfate present to calcium carbonate and also to convert the organic acids present to alkali metal salts. The precipitated calcium carbonate may be separated by filtration or other suitable means and the fermentation liquid is then ready for further treatment. If the fermentation liquid is made from molasses or other saccharine material such as beet sugar molasses which does not contain calcium sulfate, the treatment for its precipitation is of course unnecessary and the fermentation liquid may in this case be neutralized with a suitable alkali such as caustic soda in quantity sufficient to convert the organic acids to salts, or in fact the neutralization at this point in the procedure may be omitted.

The second step in the process of my invention or the first step in case the neutralizing step has been omitted is to subject the fermentation liquid to evaporation in a multiple effect vacuum evaporator. In this step I prefer to use an evaporator having at least three effects and the process will therefore be described in connection with the use of a triple effect evaporator. Continuing the supposed case, the 100,000 gallons of fermentation liquid are delivered to the evaporator, the first effect of which is heated by means of live steam. The first effect is so operated as to evaporate about 30,000 gallons of the fermentation liquid, the condensate containing about 32% of alcohol or about 96% of the total alcohol content of the fermentation liquid. The residue from the first effect then passes into the second effect operated at lower pressure and heated as is customary by the vapors produced in the first effect. In the second effect about 30,000 gallons are evaporated, giving a condensate containing about 400 gallons or 1.33% of alcohol. The residue from the second effect is delivered to the third effect operated at still lower pressure and heated by the vapors from the second effect, in which another 30,000 gallon fraction, practically free of alcohol, is evaporated, leaving a residue, about 10,000 gallons, containing the organic acids or their salts and the fertilizer material. This residue contains about 30% or 3000 gallons of water.

The three condensates and the residue produced in the triple effect evaporator as described above are worked up as follows.

The first condensate containing 32% of alcohol and free of solid impurities or a mixture of the first and second condensates containing about 16⅔% of alcohol is delivered to an alcohol still, and alcohol of the desired strength, say 96%, is produced in the usual way. The third condensate which is practically pure water, or the second and third condensates together are used as diluting water for another batch of molasses to be fermented. As a modification of the foregoing procedure a part of the residue from the evaporation in the first effect or a part of the residue from the evaporation in the second effect or both may be used for diluting the saccharine material preparatory to fermentation. By so doing the evaporation requirements in the second and third effects of the evaporator are reduced and the solids content of the fermentation liquid is increased.

The final step of the process of my invention is the treatment of the evaporation residue for the recovery of organic acids and fertilizer material.

The evaporation residue is first calcined in a retort. In case the fermentation liquid has been neutralized in accordance with my preferred procedure as described above the calcining temperature should be below that at which the salts of the organic acids decompose. A temperature of from 250 to 325° C. is preferred. The calcined residue may then be treated in any one of several ways for the recovery of the organic acids. The residue may be treated directly with alcohol and a mineral acid such as sulfuric acid and heated to drive off esters of the organic acids, but I prefer to first separate the organic acid, that is, the alkali metal salts of the acids by extracting the residue with alcohol, preferably dilute alcohol,—say 50%, which acts as a selective solvent for the organic acid salts. The resulting alcoholic solution may then be treated with a mineral acid such as sulfuric acid to produce esters of the organic acids or the organic acid salts may be recovered as such by evaporating the alcoholic solution thereof. The organic acid salts may then be worked up in any suitable way, for instance, by treatment with alcohol and a mineral acid to form esters. The residue after the removal of the organic acids contains inorganic salts and nitrogen compounds and is suitable for use as fertilizer.

The organic acid or acids recovered depend somewhat upon the raw saccharine material used. Generally, acids of the acetic acid series,—acetic acid, butyric acid, etc., are produced, but when raisins are used as the starting material tartaric acid is the principal acid recovered. Oxalic acid may be produced by providing a relatively large excess of alkali in the residue at the time of the calcination, but my preferred procedure is to just neutralize the fermentation liquid, in which case the residue does not contain an appreciable excess of alkali and oxalic acid is not produced in substantial amount.

The invention has been described and illustrated in connection with fermentation liquid made by the fermentation of molasses, but it is to be understood that the invention is not limited in this respect but is applicable generally to fermentation liquids regardless of the source, for instance, to fermentation liquids produced from potatoes, grains such as wheat, rye, barley, corn, etc., grapes, raisins, etc., and as has been indicated the nature of the products other than the alcohol will depend upon the nature of the starting material.

It is noted that the quantities of liquids referred to are merely representative. The fermentation liquid may contain varying amounts of alcohol, say from 5 to 14%, and the quantities of the various condensates referred to may be varied within a wide range to suit the conditions involved in any particular case falling within the scope of the invention.

Among the advantages of the process of my invention as described are the facts that the so-called beer still handles a quantity of liquid amounting to only 30–60% of the fermentation liquid, which liquid is free of solid matter including calcium sulfate, organic acids and the fertilizer materials. As a result, the so-called beer still operates with greater heat economy and efficiency, particularly with respect to the condensation of odorous substances, with the alcohol product. A metallic still of smaller capacity may be used and the troublesome cleaning is eliminated. The triple effect evaporator operates upon beer instead of upon slop as in the prior process referred to and the use of the concentrated slops from the first and second effects or the condensate therefrom for diluting the molasses preparatory to fermentation greatly reduces the evaporating requirements, and thus improves the heat economy of the process.

It is of course understood that the invention is not limited to the details of procedure described.

I claim:—

1. Process of treating fermentation liquid for the production of alcohol which comprises neutralizing the fermentation liquid, evaporating the neutralized fermentation liquid and collecting a fraction containing the bulk of the alcohol content of the fermentation liquid, calcining the evaporation residue, and recovering organic acids and fertilizer material therefrom.

2. Process of treating fermentation liquid containing calcium sulfate for the production of alcohol which comprises neturalizing the fermentation liquid with a soluble carbonate, separating precipitated calcium carbonate from the neutralized fermentation liquid, evaporating the separated fermentation liquid and collecting a fraction containing the bulk of the alcohol content of the fermentation liquid, calcining the evaporation residue and recovering organic acids and fertilizer material therefrom.

3. In processes for the production of alcohol from fermentation liquid containing calcium sulfate the step which consists in neutralizing the fermentation liquid with an alkali metal carbonate and separating precipitated calcium carbonate therefrom.

4. In processes for the production of alcohol from fermentation liquid the steps which consist in subjecting the fermentation liquid to evaporation in a multiple effect evaporator, and separately collecting the fraction evaporated in each effect of the evaporator.

5. In processes for the production of alcohol from fermentation liquid the steps which consist in subjecting the fermentation liquid to evaporation in a multiple effect evaporator, and separately collecting the fraction evaporated in each effect, thereby producing a fraction containing the bulk of the alcohol content of the fermentation liquid, a fraction which is practically free of alcohol and a residue.

6. In a process for the production of alcohol in which saccharine matter is diluted with an aqueous liquid and fermented to form fermentation liquid the steps which consist in fractionating the fermentation liquid, thereby producing a fraction containing the bulk of the alcohol content of the fermentation liquid, practically free of alcohol and a residue, and using the second named fraction for diluting saccharine matter to be fermented.

7. In processes for the production of alcohol in which saccharine matter is diluted with an aqueous liquid and fermented to form fermentation liquid the steps which consist in evaporating a fraction of the fermentation liquid containing the bulk of the alcohol content thereof, and using at least a part of the residual fermentation liquid for diluting more saccharine matter to be fermented.

8. Process for the production of alcohol from fermentation liquid which comprises treating fermentation liquid containing calcium sulfate with an alkali metal carbonate in quantity sufficient to convert the calcium sulfate to calcium carbonate, separating the calcium carbonate, and subjecting the purified fermentation liquid to fractional evaporation and condensation.

9. Process for the production of alcohol from fermentation liquid which comprises neutralizing the fermentation liquid and removing therefrom any precipitated matter, evaporating the neutralized and separated fermentation liquid to a residue, calcining said residue, and extracting the calcined residue with alcohol.

10. In a process for the production of alcohol in which saccharine matter is diluted with an aqueous liquid and fermented to form fermentation liquid, the steps which consist in fractionating the fermentation liquid by evaporation, thereby producing a fraction containing the bulk of the alcohol content of the fermentation liquid, a fraction practically free of alcohol and a residue, using part of the residue for diluting the saccharine matter to be fermented, and calcining the remainder of the residue.

11. In a process for the production of alcohol in which saccharine matter is diluted with an aqueous liquid and fermented to form fermentation liquid, the steps which consist in fractionating the fermentation liquid by evaporation, thereby producing a fraction containing the bulk of the alcohol content of the fermentation liquid, a fraction practically free of alcohol and a residue, and using the fraction practically free of alcohol and part of the residue for diluting the saccharine matter to be fermented.

In testimony whereof, I affix my signature.

GUSTAVE T. REICH.